ANGLE MODULATION DISCRIMINATOR-DETECTOR CIRCUIT

INVENTOR
JACK AVINS
BY
Eugene M. Whitacre
ATTORNEY

ANGLE MODULATION DISCRIMINATOR-DETECTOR CIRCUIT

Filed Feb. 15, 1968 2 Sheets-Sheet 2

INVENTOR
JACK AVINS
BY Eugene M. Whitacre
ATTORNEY 3,519,944

ANGLE MODULATION DISCRIMINATOR-DETECTOR CIRCUIT

Jack Avins, Princeton, N.J., assignor to RCA Corporation, a corporation of Delaware Filed Feb. 15, 1968, Ser. No. 705,709
Int. Cl. H03d *3/02*
U.S. Cl. 329—103 16 Claims

ABSTRACT OF THE DISCLOSURE

A discriminator network having only a single tuned circuit generates two antiphase voltages with frequency-amplitude characteristics such that the differences between their peak values produce a linear discriminator characteristic. The network comprises the parallel combination of a parallel tuned circuit and two series capacitors driven by a suitable source of angle modulated waves with the junction of the two series capacitors connected to a point of reference potential. The antiphase voltages are fed to respective input electrodes of a differential amplifier-detector network.

This invention pertains to angle modulation systems, and more particularly to angle modulation discriminators which are particularly useful for integrated circuit applications. The term angle modulation as used herein refers to frequency or phase modulated wave or waves modulated in both frequency and phase.

Integrated circuit technology has heretofore been applied to angle modulation detectors. One example of a frequency modulation detector system using integrated circuit techniques is described in an article published in the Mar. 21, 1966, issue of Electronics at page 137, by Jack Avins. The system described in that article is currently being used commercially, and has been found to provide exceptionally high standards of performance in the field. In order to more fully capitalize on the advantages of the integrated circuit technology, it is desirable to reduce the cost of the components not incorporated on the integrated circuit chip and to more fully utilize the design constraints and advantages of integrated circuits as compared to lumped constant circuits to improve the operating performance.

It is an object of the present invention to provide an improved frequency discriminator network.

It is another object of the present invention to provide an improved angle modulation detector system utilizing integrated circuit techniques.

An angle modulation detector system embodying the present invention includes a discriminator network having a parallel tuned circuit including a first capacitor and inductor in parallel with series-connected second and third capacitors. The junction of the second and third capacitors is connected to a point of reference potential. Angle modulated waves from a suitable source are applied across one of the second and third capacitors, and a pair of antiphase voltages are derived from opposite ends of the parallel tuned circuit. The parameters of the components are selected so that the pair of antiphase voltages when rectified and subtracted produce a linear discriminator characteristic.

In accordance with a feature of the invention, the antiphase voltages from this discriminator network are applied to a differential amplifier-detector. These voltages are 180° apart in phase rather than at asymmetrical angles as in prior art quadrature systems. The symmetry characteristic of this antiphase operation enhances the amplitude-modulation rejection when the discriminator network is used to drive the balanced differential amplifier-detector network.

A complete understanding of the invention may be obtained from the following detailed description, when taken in conjunction with the accompanying drawings, in which.

Figure 1:
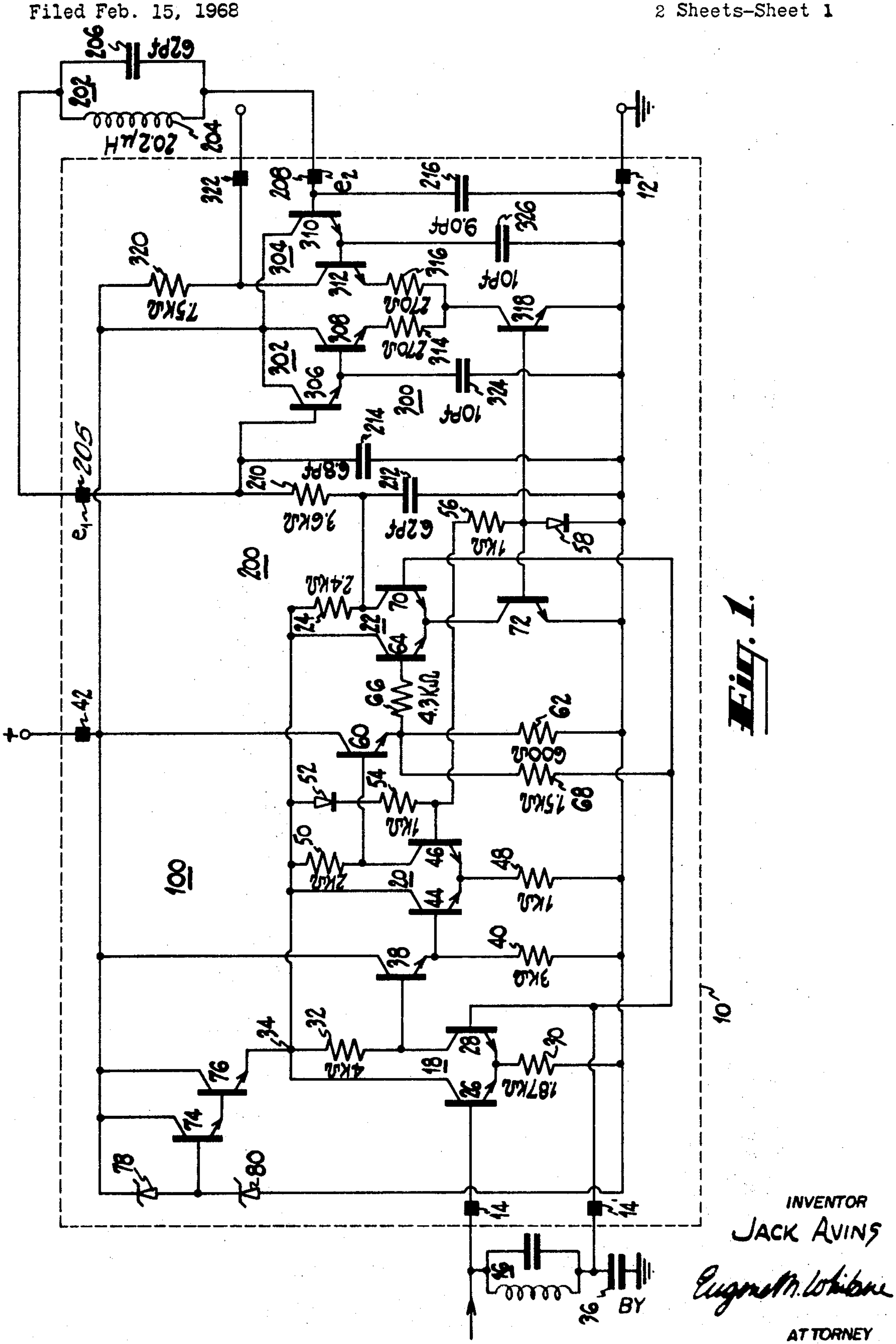
FIG. 1 is a schematic circuit diagram of an angle modulation detector system embodying the present invention.

The dashed rectangle 10 of FIG. 1 schematically illustrates a monolithic semiconductor chip. The chip has a plurality of contact areas about its periphery, through which external connections to the circuits on the chip can be made. For example, the contact 12 provides a common or ground potential contact area, which is connected to the various circuit-ground connections on the chip. The circuit includes a limiter 100, a discriminator 200, a portion of which is external to the chip, and a differential amplifier-detector 300.

A frequency modulated carrier wave developed across the tuned circuit 16 is applied to the input terminals 14 and 14' of the limiter 100. The signal is translated through three amplifier-limiter stages 18, 20 and 22 and is developed across an output load resistor 24. The signal developed across resistor 24 is applied to the discriminator 200, which develops two antiphase voltages that drive the detector 300.

The limiter stage 18 includes three transistors 26, 28 and 38. The emitter electrodes of transistors 26 and 28 are directly connected, the junction being connected to ground by a resistor 30. A load resistor 32 is connected between the collector electrode of the transistor 28 and a junction point 34. A source of positive regulated potential is developed at the junction point 34, described more fully hereinafter. The collector electrode of the transistor 26 is directly connected to the junction point 34 and the base electrode of the transistor 28 is connected to ground by a radio-frequency (RF) bypass capacitor 36. The base electrode of the transistor 26 is connected to the capacitor 36 through the tuned input circuit 16 connected across the terminal 14 and 14'. The transistor 38 in an emitter follower configuration is coupled to receive signals developed across the resistor 32. The transistor 38 has its emitter electrode connected to the ground by a resistor 40. The collector electrode of the transistor 38 is directly connected to a source of positive potential applied to the chip through the contact terminal 42.

The output signal taken at the emitter electrode of the transistor 38, is applied to the second limiter stage 20, which includes the transistors 44, 46 and 60. The emitter electrodes of the transistors 44 and 46 are directly connected, and their junction is connected to the ground by a resistor 48. The collector electrode of the transistor 46 is connected to the junction point 34 by a load resistor 50, and the collector electrode of the transistor 44 is directly connected to the junction point 34. A diode 52, a resistor 54, a resistor 56 and a diode 58 are connected in series between the junction point 34 and ground to provide a suitable bias at the junction of the two resistors for the base electrode of the transistor 46.

The transistor 60 is connected as an emitter follower, and signals developed across the emitter output resistor 62 are applied to the third limiter stage 22 through a resistor 66. The collector electrode of the transistor 60 is directly connected to the source of positive potential through contact terminal area 42. A resistor 68 interconnects the emitter electrode of the transistor 60 and the RF bypass capacitor 36. This connection provides a negative feedback loop to stabilize the limiter circuit by providing the necessary operating bias for the base electrodes of the transistors 26, 28 and 70.

The final limiter stage 22 includes the transistors 64 and 70. The emitter electrodes of the transistors 64 and 70 are directly connected, and their junction is connected, to ground through the emitter-collector current path of a transistor 72 which provides a constant source of current. The base electrode of the transistor 72 is interconnected with the junction point of the resistor 56 and the diode 58. A load resistor 24 interconnects the collector electrode of the transistor 70 to the junction point 34, and a direct connection is provided between the collector electrode of the transistor 64 and the junction point 34. The base electrode of the transistor 70 is directly connected to the RF bypass capacitor 36.

The resistor 66 has the base current of the transistor 64 flowing through it, and the resistor 68 has the base currents of the transistors 26, 28 and 70 flowing through it. Therefore, to achieve substantially equal bias potential on the base electrodes of the transistors 64 and 70, the resistor 66 should be three times as large as the resistor 68, assuming that all the transistors draw the same base current. That is, the resistors 66 and 68 should be apportioned so that the voltage drops from the emitter electrode of the transistor 60 across the respective resistors are equal. It should be noted that the importance of the ratio is advantageous in integrated circuit fabrication techniques where it is difficult to regulate the absolute value of components, but comparatively easy to regulate their relative values. Where equal transistor base currents are not used, the required ratio of the resistor 66 to the resistor 68 is readily determined.

The biasing arrangement of the limiter circuit is accomplished utilizing only a single RF bypass capacitor 36 in the feedback network. This reduces the number of external components to be used in connection with the integrated circuit chip.

Referring now to the regulated voltage supply at the junction point 34, a positive source of potential is applied to the contact area 42. A transistor 74 has its collector electrode directly connected to the terminal 42 and, hence, the positive source of potential. The emitter electrode of the transistor 74 is directly connected to the base electrode of a transistor 76. The base electrode of the transistor 74 is connected to a junction point of two Zener diodes 78 and 80 which are connected in series between the terminal 42 and the ground. The collector and emitter electrodes of the transistor 76 are connected between the terminal 42 and the junction point 34. The specific form of voltage regulation is a matter of choice and is not critical to the operation of the circuit.

Discriminator 200 utilizes a single parallel tuned circuit rather than the two tuned circuits typical of the prior art. Because one tuned circuit is used, there is a substantial cost saving in the discriminator network and in labor because the single tuned circuit phase-shift discriminator is more easily aligned than the prior art two tuned circuit systems.

The discriminator 200 includes a tuned circuit 202 comprising an inductor 204 and a capacitor 206 which are not part of the integrated circuit chip but are connected electrically to the chip by the contact areas 205 and 208. A resistor 210 and a capacitor 212 are connected in series between terminal 206 and the ground, the junction of the resistor and the capacitor being directly connected to the collector electrode of the transistor 70. Two capacitors 214 and 216 are connected across each side of the tuned circuit and the ground. That is, capacitor 214 is connected between the terminal 206 and the ground, and the capacitor 216 is connected between the terminal 208 and the ground.

In operation, the rectangular voltage wave shape which would otherwise appear across the load resistor 24 at the last limiter stage 22 is altered by the integrating capacitor 212 to develop a partially integrated or triangular wave form at the junction of the resistor 210 and the capacitor 212. This integrated wave form is further integrated by the capacitor 214 so that harmonic components at the two input terminals to the differential amplifier-detector 300 are substantially reduced.

Output signals are derived from the discriminator 200 across the capacitor 214 and the capaictor 216. The output signals provide balanced drive voltages to the amplifier-detector network 300 and are 180° apart in phase rather than at an asymmetrical angle as in prior art quadrature systems. Anti-phase operation of the discriminator network enhances the ampltiude modulation rejection of the amplifier-detector because there is a reduction in the period during which both rectifier transistors of the amplifier-detector conduct simultaneously. Moreover, the discriminator network is so configured that it provides a common DC path from the output of the limiter through the discriminator network to the input of each detector circuit. Thus, a DC path is provided from the collector electrode of the transistor 70 through the resistor 210 to the electrode of the rectifier transistor 306 and, in a like manner, a DC path is provided from the collector electrode of the transistor 70 through the resistor 210 and the inductor 204 to the base electrode of the rectifier transistor 310. This DC path which links both amplifier-detector inputs and the last limiter stage 22 permits the detector transistors of the amplifier-detector 300 to be equally biased to give balanced operation without the need for adjusting separate bias circuits. Moreover, since the two input terminals to the amplifier-detector 300 are interconnected by the inductor 204, the same AM components are applied on both sides of the detector, the advantage of which will be more fully explained hereinafter.

Figure 2:
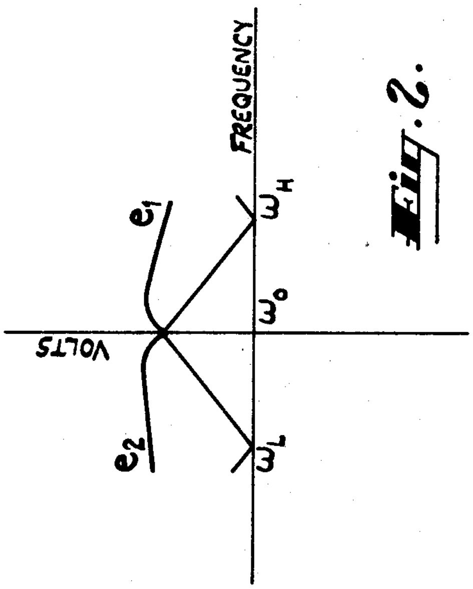
FIG. 2 is a plot of the output signals as a function of frequency of the discriminator portion of the angle modulation detector system.

The principal frequencies of the phase-shift discriminator 200 are $\omega_O$, the discriminator center frequency, $\omega_L$ the frequency of the lowest voltage signal output from one of the discriminator output connections, and $\omega_H$ the frequency of the lowest voltage signal output from another of the discriminator output connections, and are as shown in FIG. 2. The figure is a plot of the output signals as a function of frequency of the discriminator portion of the angle modulation detector system. The push-pull drive signals are taken across either end of the parallel tuned circuit 202 and are designated, for convenience, $e_1$ and $e_2$. $e_1$ is the discriminator output signal derived across the capacitor 214, and $e_2$ is the output signal derived across the capacitor 216. At the discriminator center frequency $\omega_O$, these voltages are equal in magnitude and opposite in phase. On either side of the center frequency, over a specified range, the amplitude of one signal increases, while the amplitude of the other signal decreases, the phase remaining substantially 180° apart.

The principal frequencies can be determined as follows. From FIG. 1, it is clear that $e_2$ will be a minimum at the resonant frequency of $L_{204}C_{206}$ where the tuned circuit displays its greatest impedance. That is, when $$\omega^2=\omega_H{}^2=\frac{1}{L_{204}C_{206}}$$

In a like manner, $e_1$ will be a minimum when the equivalent inductive susceptance of $L_{204}C_{206}$ is equal to the capactive susceptance of $C_{216}$. Thus:

$$-j\omega_L C_{216}=j\omega_L C_{206}+\frac{1}{j\omega_L L_{204}}$$

from which $$\omega_L{}^2=\frac{1}{L_{204}(C_{206}+C_{216})}$$

the cross-over frequency $\omega_O$ of the phase-shift discriminator 200 will occur when the inductive susceptance of $L_{204}C_{206}$ is half of the capactive susceptance of $C_{216}$.

$$-j\omega_O C_{216}=2\left(j\omega_O C_{206}+\frac{1}{j\omega_O L_{204}}\right)$$

from which $$\omega_O{}^2=\frac{1}{L_{204}\left(C_{206}+\frac{C_{216}}{2}\right)}$$

the principal frequencies are indicated on the wave forms shown in FIG. 2 which are the voltages $e_1$ and $e_2$ across $C_{214}$ and $C_{216}$ as a function of frequency. The resonant frequency of the composite $\pi$ network including $C_{214}$, $L_{204}C_{206}$ and $C_{216}$ is given by $$\omega_r{}^2=\frac{1}{L_{204}\left(C_{206}+\frac{C_{214}C_{216}}{C_{214}+C_{216}}\right)}$$

In the special case where $C_{214}=C_{216}$ $$\omega r^2=\omega_O{}^2=\frac{1}{L_{204}\left(C_{206}+\frac{C_{216}}{2}\right)}$$

so that the resonant frequency of the composite $\pi$ section is equal to the center frequency of the discriminator circuit. Symmetry of the wave forms shown in FIG. 2 is obtained by the selection of the capacitors 214, 216 and 212, in addition to the resistor 210. Equal values of capacitance for the capacitors 214 and 216 are not required because the value of the resistor 210 can be chosen to provide the desired symmetry in the discriminator output signals. It is desirable that the Q of the inductor 204 be maintained high in order to avoid departure from the 180° phase difference between $e_1$ and $e_2$.

Figure 3:
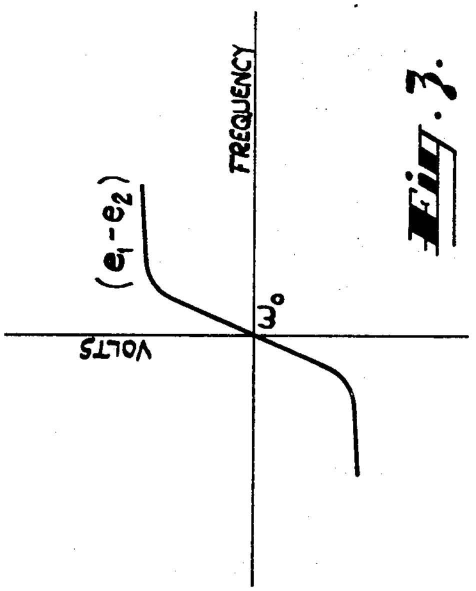
FIG. 3 is a plot of the resultant waveform obtained by subtracting the values of the two rectified discriminator output signals over the linear range as a function of frequency.

The linear region for $e_1-e_2$ as a function of frequency is the frequency range between the two peak values of $e_1$ and $e_2$ as shown in FIG. 2. Beyond this range, $e_1-e_2$ no longer varies linearly as a function of frequency. FIG. 3, in a different scale, shows the resultant wave form obtained by subtracting the value of the two discriminator output signals over the linear range as a function of frequency. From the equations for $\omega_L$ and $\omega_H$, it can be seen that the frequency range between $\omega_L$ and $\omega_H$ increases as the ratio of $C_{216}$ divided by $C_{206}$ is increased.

The drive for the discriminator 200 is taken from the collector electrode of the transistor 70 of the limiter stage 22. In the intercarrier sound channel of a televisison receiver, the drive would be a square wave of current at 4.5 mTz. The filtering action of the network including capacitor 212 in association with the resistor 210 and capacitor 214 is effective in substantially attenuating harmonics of the 4.5 mHz. fundamental so that the voltages $e_1$ and $e_2$ are essentially sinusoidal. This attenuation of harmonics improves the balance of the system in that the harmonics do not appear at the amplifier-detector network input terminals. An advantage of the phase-shift discriminator 200 for application in TV and FM radio is that the capacitors 214 and 216 are of a magnitude which can be readily integrated on a monolithic silicon chip. For operation at substantially lower frequencies, however, these capacitors can be mounted peripherally to the integrated circuit chip.

It should be noted that the tuned circuit 202 of the discriminator 200 is not susceptible to fabrication in integrated circuit form; however, the discriminator utilizes only one tuned circuit rather than the two tuned circuits typical of the prior art and thereby reduces the cost in number of peripheral components which must be mounted external to the chip.

Figure 4:
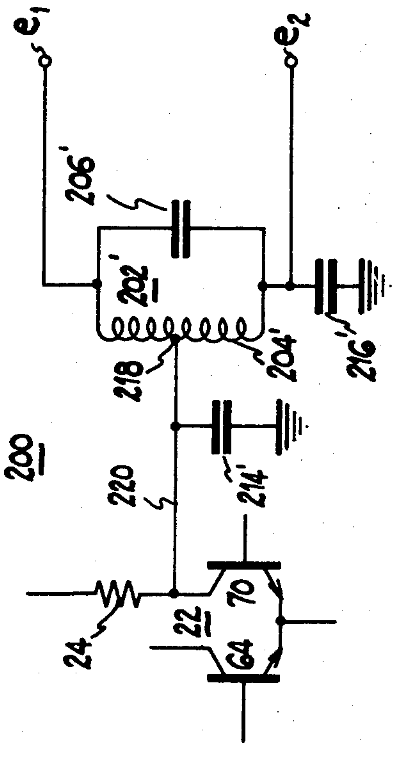
FIG. 4 is a schematic circuit diagram of an alternate discriminator network with center tap drive to the tuned circuit.

An alternate phase-shift network for use with the differential amplifier-detector network 300 is shown in FIG. 4. This phase-shift network has a quadrature relationship between the voltages rather than the previously described anti-phase operation of the discriminator network shown in FIG. 1. The discriminator output signals are derived across the tuned circuit 202' which includes the inductor 204' and the capacitor 206'. A center tap connection 218 on the inductor 204' is provided and is directly connected by a lead 220 to the collector electrode of the transistor 70 in the last limiter stage 22 of the previously described limiter 100. A capacitor 214' interconnects the lead 220 and the ground, and a capacitor 216' interconnects one end of the tuned circuit 202' and the ground.

The general operation of the phase-shift network is similar to the discriminator shown in FIG. 1 so far as the integration of the square wave of current across the capacitor 214'. The quadrature voltage is induced across the tuned circuit 202' at its resonant frequency. This resonant frequency of the tuned circuit 202' is the discriminator center frequency. The capacitor 216' is the circuit component which results in the development of the quadrature voltage.

It should be noted that although the discriminator network of both FIG. 1 and FIG. 4 utilizes a single tuned circuit, the phase-shift network shown in FIG. 4 has its tuned circuit 202' resonant at the discriminator center frequency whereas the phase-shift network shown in FIG. 1 has its tuned circuit 202 resonant at the frequency $\omega_H$ which is substantially removed from the discriminator center frequency and its center frequency $\omega_O$ is at the frequency where the tuned circuit 202 appears to be an inductive reactance. The anti-phase operation of the discriminator shown in FIG. 1 gives greater AM rejection when used with the differential amplifier-detector network 300, which is described in greater detail hereinafter, as the anti-phase relationship results in maximum symmetry and a minimum overlap of the conduction periods of the transistors in the detector circuit. This is especially important when AM is present and it is desired that the AM component not produce a contribution to the current in the output of the detector.

Referring again to FIG. 1, the output of the phase-shift discriminator 200 taken across the capacitors 214 and 216 drives the amplifier-detector 300. The amplifier-detector 300 includes two amplifier-detectors 302 and 304. Each of the stages 302 and 304 comprise a first transistor having its emitter electrode directly connected to the base electrode of a second transistor. Thus, a transistor 306, which has its base electrode connected to one side of the tuned circuit 202 through the contact area 205, has its emitter electrode directly connected to the base electrode of a transistor 308. In a like manner, a transistor 310, which has its base electrode connected to the other side of the tuned circuit 202 through a contact area 208, has its emitter electrode directly connected to the base electrode of a transistor 312.

The transistors 308 and 312 have their electrodes interconnected to form a differential amplifier. The emitter electrodes of the transistors 308 and 312 are connected to the collector electrode of a constant current transistor 318 by two resistors 314 and 316, respectively. The resistors 314 and 316 provide degeneration for the differential amplifier. The constant current source includes the transistor 318 and its biasing circuitry, the resistor 56 and the diode 58. The emitter electrode of the transistor 318 is directly connected to the ground and the base electrode is connected to the anode of the diode 58.

A resistor 320 connects the collector electrode of the transistor 312 to the source of potential applied at the contact area 42. An output contact area 322 is connected to the collector electrode of the transistor 312. A bypass capacitor may be connected between the collector electrode of the transistor 312 and the ground. The output terminal 322, in the present embodiment, is adapted to provide an output potential representative of the angular deviation, frequency or phase, of the wave applied to the input terminals 14 and 14' of the angle modulation detector system. The transistors 306, 308 and 310, as is the case with the transistor 312, are operated from the source of positive potential applied to the contact area 42. Thus, a direct connection is provided between the collector electrodes of the transistors 306, 308 and 310 and the contact area 42.

Since the two transistors 306 and 310 of the amplifier-detector stages 302 and 304 are directly connected to the base electrodes of the transistors 308 and 312, respectively, the input resistance of the transistors 308 and 312 provides substantially all the load resistance for the two transistors 306 and 310. Because the input impedance of the transistors 308 and 312 is very high, the transistors 306 and 310 are substantially biased to cutoff and, consequently, exhibit high sensitivity because there is substantially no threshold level which must be reached before detection occurs.

When the capacitance associated with the base to emitter junction of the transistors 308 and 312, which form the differential amplifier, is too small to give the desired time constant needed for demodulation, additional capacitance such as a capacitor 324 is connected between the emitter electrode of the transistor 306 and the ground, and a capacitor 326 is connected between the emitter electrode of the transistor 310 and the ground. By the addition of the capacitors 324 and 326 the desired time constants are achieved. These capacitors can be of a very small value owing to the high input resistance associated with the transistors 304 and 306, and therefore, are susceptible of fabrication on an integrated circuit chip.

In operation, the constant current source transistor 318 which is connected in the emitter circuit of the transistors 308 and 312 determines the total collector currents which flow through the transistors of the differential amplifier. This, in turn, determines the current flowing in the base electrodes of the transistors 308 and 312. Since there is no shunt path between the emitter electrode of the transistors 306 and 310 and the ground, the emitter current flow in the rectifier transistors 306 and 310 is substantially the base current which is flowing in the transistors 308 and 312. In this manner, the rectifier transistors 306 and 310 are biased to cut off so that detection occurs at relatively low signal input levels.

The modulated RF signal input to the amplifier-detector 300 is a balanced input which is applied at the base electrode of the rectifying transistors 306 and 310. The modulated RF signal input applied to the base electrode of the rectifier transistors 306 and 310 varies oppositely in amplitude as a function of the angle modulated signal applied to the input terminals 14 and 14' and is rectified by the transistors before being applied as the input signal to the differential amplifier to produce the desired demodulated output at the contact area 322.

Improved amplitude modulation rejection capability for the amplifier-detector system is obtained because the configuration which includes the transistors 308 and

312 interconnected as a differential amplifier provides high common mode rejection capability. In addition, because of the high gain associated with the differential amplifier, only very low levels of RF input signals are required to obtain a high level of output signal. Low level RF input signals minimize the problems of RF radiation associated with conventional modulation signal detector schemes.

Should the differential amplifier be used as a double-ended system, that is, with a load resistor in the collector electrode circuit of the transistor 308, the system would be suitable for use as an automatic frequency control system. Such a system is disclosed in my application filed Mar. 2, 1967, Ser. No. 620,006 and entitled "Automatic Frequency Control Apparatus." Where the collector electrodes of the transistors 308 and 312 are shorted together to defeat the automatic frequency control, a variable reactance in a local oscillator circuit which has its value controlled by the automatic frequency control voltage may be easily returned to a desired reference level. Stability and tracking of the automatic frequency control defeat condition is excellent because the constant current transistor 308 makes the reference voltage substantially independent of the drive signal conditions.

Figure 5:
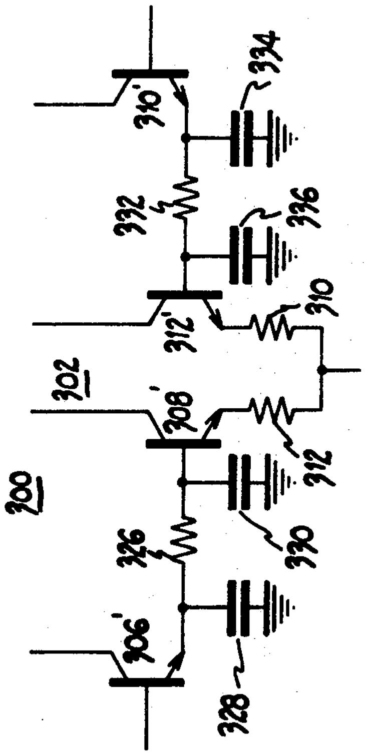
FIG. 5 is a schematic circuit diagram of a modification of the amplifier-detector portion of the angle modulation detector system.

Reference is now made to FIG. 5 which is a modification of the amplifier-detector portion of the angle modulation detector systems. The circuit of FIG. 5 is similar to the amplifier-detector shown in FIG. 1 except that a resistor and a capacitor have been added to the network interconnecting each rectifier transistor to the differential amplifier. The emitter electrode of the rectifier transistor 306' is connected to the base electrode of the transistor 308' by a resistor 326. A capacitor 328 interconnects the emitter electrode of the transistor 306' and the ground, and a capacitor 330 interconnects the base electrode of the transistor 308' and the ground. In a like manner, the resistor 332 interconnects the emitter electrode of the transistor 310' and the base of the transistor 312'. A capacitor 334 connects the emitter electrode of the transistor $\mathbf{310_2}$ to the ground, and a capacitor 336 connects the base electrode of the transistor 312' to the ground. The resistors 326 and 332 may be of unequal value to improve amplitude modulation rejection. A similar effect can be achieved with a single resistor.

Utilization of two capacitors in the emitter circuit of the rectifier transistors, as in FIG. 5, is particularly suited for low frequency applications where it may be advantageous to provide an additional filter section. In this way, the desired rectification and filtering is accomplished with a minimum total value of capacitance.

What is claimed is:

1. In an angle modulation signal system of the type comprising a source of angle modulated signals to be demodulated a discriminator network comprising:

a first and a second capacitor connected in series;

an inductor coupled across said first capacitor and coupled to said source of angled modulated signals;

means coupling said source of angle modulated signals to said inductor;

a second signal output circuit coupled across said first and said second capacitor; and said first capacitor, said second capacitor and said inductor selected such that the voltages developed across said first output circuit and said second output circuit are substantially antiphase.

2. In an angle modulation signal system of the type comprising a source of angle modulated signals to be demodulated a discriminator network comprising:

a first and a second capacitor connected in series across said source of angle modulated signals;

an inductor coupled across said first capacitor, the parameters of said inductor and said first capacitor selected to resonate at a frequency near the upper end of the frequency range of said angle modulated signals, and the parameters of said first, and said second capacitors and said inductor selected to resonate at a frequency near the lower end of the range of said angle modulated signals; and signal utilization means coupled across said second capacitor and across said first and said second capacitors.

3. An angle modulation system as defined in claim 2 including a third capacitor connected in parallel with said series connected first and second capacitors, such that signals of equal amplitude appear at said signal utilization means at a frequency near the center of the frequency range of said angle modulated signals.

4. An angle modulation system as defined in claim 3 including a resistor coupled between said source of angle modulated signals and the junction of said first and said third capacitors.

5. An angle modulation system as defined in claim 4 including a fourth capacitor connected across said source of angle modulated signals.

6. A signal system comprising:

a source of angle modulated signals;

a first and a second capacitor connected in series;

an inductor coupled across said first capacitor and coupled to said source of angle modulated signals;

a source of operating potential;

a first and a second rectifier transistor each having an input electrode and an output electrode, said transistors operated from said source of operating potential, said first rectifier transistor input electrode coupled to the junction of said first and said second capacitor and said second rectifier input electrode coupled to the junction of said first capacitor and said inductor remote from said second capacitor;

a third and a fourth transistor operated from said source of operating potential;

means for interconnecting said third and said fourth transistors to form a differential amplifier having a first and a second input electrode, said first differential input electrode connected to said first rectifier transistor output electrode to provide the only DC path between said first rectifier transistor output electrode and said first differential input electrode and said second differential input electrode connected to said second rectifier transistor output electrode to provide the only DC path between said second rectifier transistor output electrode and said second differential input electrode;

the parameters of said first capacitor, said second capacitor and said inductor selected so that signals of equal amplitude appear at said first rectifier transistor input electrode and said second rectifier transistor input electrode at a frequency near the center of the frequency range of said angle modulated signals; and signal utilization means coupled to said differential amplifier.

7. A system comprising:

a discriminator network adapted to convert angle modulated signals to amplitude modulated signals;

a source of operating potential;

a first and a second rectifier transistor each having an input electrode and an output electrode, said transistors operated from said source of operating potential, and having their input electrodes coupled to said discriminator network;

a third and a fourth transistor operated from said source of operating potential;

means for interconnecting said third and said fourth transistors to form a differential amplifier having a first and a second input electrode, said first differential input electrode connected to said first rectifier transistor output electrode to provide the only DC path between said first rectifier transistor output electrode and said first differential input electrode and said second differential input electrode connected to said second rectifier transistor output electrode to provide the only DC path between said second rectifier transistor output electrode and said second differential input electrode; and signal utilization means coupled to said differential amplifier.

8. A system as defined in claim 7 wherein a first capacitor connects the junction of said first rectifier transistor output electrode and said first differential input electrode to a point of reference potential and a second capacitor connects the junction of said second rectifier transistor output electrode and said second differential input electrode to said point of reference potential.

9. A system comprising:

a discriminator network adapted to convert angle modulated signals to amplitude modulated signals;

a source of operating potential;

a first and a second rectifier transistor each having an input electrode and an output electrode, said transistors operated from said source of operating potential and having their input electrodes coupled to said discriminator network;

a third and a fourth transistor, operated from said source of operating potential;

means for interconnecting said third and said fourth transistors to form a differential amplifier having a first and a second input electrode;

first connecting means interconnected said first rectifier transistor output electrode and said first differential input electrode to provide the only DC path between said first rectifier transistor output electrode and said first differential input electrode;

second connecting means interconnecting said second rectifier transistor output electrode and said second differential input electrode to provide the only DC path between said second rectifier transistor output electrode and said second differential input electrode, one of said first and said second connecting means consisting of a resistor connected between said rectifier output electrode and said differential input electrode; and signal utilization means coupled to said differential amplifier.

10. A system as defined in claim 9 wherein said other connecting means consist of a resistor connected between said rectifier transistor output electrode and said differential input electrode.

11. A system as defined in claim 10 wherein said first and said second connecting means each includes a first capacitor connecting one end of said resistor to a point of reference potential and a second capacitor connecting the other end of said resistor to said point of reference potential.

12. An angle modulation system as defined in claim 2 including a resistor coupled between said source of angle modulated signals and said first capacitor.

13. A signal system comprising:

a source of angle modulated signals;

a first and a second capacitor connected in series;

an inductor coupled across said first capacitor and coupled to said source of angle modulated signals;

first and second rectifier means each having an input electrode and an output electrode, said first rectifier means input electrode coupled to the junction of said first and said second capacitor and said second rectifier input means coupled to the junction of said first capacitor and said inductor remote from said second capacitor;

a first and a second transistor operated from said source of operating potential;

means for interconnecting said first and said second transistors to form a differential amplifier having a first and a second input electrode, said first differential input electrode connected to said first rectifier means output electrode to provide the only DC path between said first rectifier means output electrode and said first differential input electrode and said second differential input electrode connected to said second rectifier means output electrode to provide the only DC path between said second rectifier means output electrode and said second differential input electrode; and signal utilization means coupled to said differential amplifier.

14. A signal system as defined in claim 13 wherein said first rectifier means, said second rectifier means, said first transistor and said second transistor are disposed in an integrated circuit.

15. A signal system as defined in claim 14 wherein said second capacitor is disposed in said integrated circuit.

16. A system as defined in claim 14 wherein a third capacitor disposed in said integrated circuit connects the junction of said first rectifier means output electrode and said first differential input electrode to a point of reference potential and a fourth capacitor disposed in said integrated circuit connects the junction of said second rectifier means output electrode and said second differential input electrode to said point of reference potential.

References Cited

UNITED STATES PATENTS

| | | | |
|---|---|---|---|
| 2,248,229 | 7/1941 | Green | 329—137 |
| 3,137,821 | 6/1964 | Richwell | 329—135 |
| 3,183,449 | 5/1965 | Bray | 307—233 X |
| 3,217,263 | 11/1965 | Starreveld et al. | 329—137 |
| 3,399,353 | 8/1968 | Avins | 329—103 X |
| 3,416,091 | 12/1968 | Overtveld. | |

ALFRED L. BRODY, Primary Examiner

U.S. Cl. X.R.

307—233; 329—137; 330—30

UNITED STATES PATENT OFFICE
CERTIFICATE OF CORRECTION

Patent No. 3,519,944 Dated July 7, 1970

Inventor(s) Jack Avins

It is certified that error appears in the above-identified patent and that said Letters Patent are hereby corrected as shown below:

In Column 4, line 47, after "the" (first occurrence) and before "electrode" insert -- base --. Column 5, line 23, after "$C_{216}$." insert -- Thus: --; Column 5, line 42, that portion of the formula reading "$\omega r^2 = \omega_o^2$" should read -- $\omega_r^2 \approx \omega_o^2$ --; Column 5, line 70, delete "mTz" and substitute -- MHz --. Column 8, line 40, delete "$310_2$" and substitute -- 310' --; Column 8, line 59, after "inductor;" insert the following paragraph:

-- a first signal output circuit coupled across said second capacitor; --.

SIGNED AND SEALED NOV 24 1970

(SEAL)
Attest:

Edward M. Fletcher, Jr.
Attesting Officer

WILLIAM E. SCHUYLER, JR.
Commissioner of Patents